(12) United States Patent
Epperlein et al.

(10) Patent No.: US 11,948,101 B2
(45) Date of Patent: Apr. 2, 2024

(54) IDENTIFICATION OF NON-DETERMINISTIC MODELS OF MULTIPLE DECISION MAKERS

(71) Applicant: INTERNATIONAL BUSINESS MACHINES CORPORATION, Armonk, NY (US)

(72) Inventors: Jonathan P. Epperlein, Phibsborough (IE); Jakub Marecek, Dublin (IE); Robert Shorten, Rathfarnham (IE); Giovanni Russo, Dublin (IE); Sergiy Zhuk, Dublin (IE)

(73) Assignee: International Business Machines Corporation, Armonk, NY (US)

(*) Notice: Subject to any disclaimer, the term of this patent is extended or adjusted under 35 U.S.C. 154(b) by 958 days.

(21) Appl. No.: 16/239,270

(22) Filed: Jan. 3, 2019

(65) Prior Publication Data
US 2020/0218998 A1 Jul. 9, 2020

(51) Int. Cl.
G06N 20/00 (2019.01)
G06N 7/01 (2023.01)
G05D 1/00 (2006.01)
H04L 67/01 (2022.01)

(52) U.S. Cl.
CPC .............. G06N 7/01 (2023.01); G06N 20/00 (2019.01); *G05D 1/0088* (2013.01); *G05D 1/0221* (2013.01); *H04L 67/01* (2022.05)

(58) Field of Classification Search
CPC ...... G06N 7/005; G06N 20/00; G05D 1/0088; G05D 1/0221; G05D 2201/0213; H04L 67/42
See application file for complete search history.

(56) References Cited

U.S. PATENT DOCUMENTS

| 5,337,404 | A | 8/1994 | Grant |
| 7,480,640 | B1* | 1/2009 | Elad ........................ G06F 15/18 706/14 |
| 8,478,642 | B2 | 7/2013 | Dey |
| 9,251,275 | B2 | 2/2016 | Herman |
| 9,836,695 | B2 | 12/2017 | Kozloski |
| 2010/0106603 | A1 | 4/2010 | Dey et al. |
| 2013/0282396 | A1* | 10/2013 | Lagor ................. G06F 19/3437 705/2 |
| 2014/0344270 | A1 | 11/2014 | Lambert |
| 2016/0283848 | A1* | 9/2016 | Kozloski ................ G06N 5/045 |
| 2017/0308836 | A1 | 10/2017 | Kass |

(Continued)

OTHER PUBLICATIONS

Peng, H., et al., Retweet Modeling Using Conditional Random Fields, [retrieved on Dec. 8, 2021]. Retrieved from Internet:<https://ieeexplore.ieee.org/abstract/document/6137399> (Year: 2011).*

(Continued)

*Primary Examiner* — Kevin W Figueroa
*Assistant Examiner* — Bart I Rylander
(74) *Attorney, Agent, or Firm* — Brian M. Restauro

(57) ABSTRACT

Embodiments for identifying stochastic models representing the individual decision makers in a computing environment by a processor. One or more non-deterministic (stochastic, probabilistic) models may be identified according to a sequence of outcomes from decisions of each of a plurality of decision makers.

14 Claims, 9 Drawing Sheets

(56) References Cited

U.S. PATENT DOCUMENTS

2018/0276695 A1* 9/2018 Dione ............... G06Q 30/0202

OTHER PUBLICATIONS

Feng, W., et al., Retweet or not? Personalized Tweet Re-ranking, [retrieved on Dec. 8, 2021]. Retrieved from Internet:<https://dl.acm.org/doi/abs/10.1145/2433396.2433470> (Year: 2013).*

Podpora, M., et al., Policy-based Self-configuration of Autonomous Systems Information Inputs, [retrieved Jun. 28, 2022]. Retrieved from Internet:<https://ieeexplore.ieee.org/abstract/document/6663047> (Year: 2013).*

Jin, J., et al., Evasive Bots Masquerading as Human Beings on the Web, [retrieved [Jun. 28, 2022]. Retrieved from Internet:<https://ieeexplore.ieee.org/abstract/document/6575366> (Year: 2013).*

Kuhn, D., et al., Adding attributes to Role-Based Access Control, [retrieved Jul. 7, 2022]. Retrieved from Internet:<chrome-extension://efaidnbmnnnibpcajpcglclefindmkaj/https://csrc.nist.rip/groups/SNS/rbac/documents/kuhn-coyne-weil-10.pdf> (Year: 2010).*

Chu, Z., et al., Detecting Automation of Twitter Accounts: Are You a Human, Bot, or Cyborg?, [retrieved Jun. 29, 2022]. Retrieved from Internet:<https://ieeexplore.ieee.org/abstract/document/6280553 (Year: 2012).*

Raghavan, V., Coupled Hidden Markov Models for User Activity in Social Networks, [retrieved Jun. 16, 2022]. Retrieved from Internet:<https://ieeexplore.ieee.org/abstract/document/6618397>(Year: 2013).*

Anonymous, "Closed-Loop Systems Model Estimation Methods (System Identification Toolkit)", National Instruments, Edition Date: Jun. 2009, <https://web.archive.org/web/20110727232544/http://zone.ni.com/reference/en-XX/help/372458B-01/lvsysidconcepts/closed-loop_est/>, 2 pages.

Anonymous, "Identification of Closed Loop Systems", National Instruments, Publish Date: Nov. 28, 2018, <https://web.archive.org/web/20190302121815/https://www.ni.com/white-paper/4321/en/>, 3 pages.

Anonymous, "Software", TUDelft, Delft Center for Systems and Control, Last modified: Dec. 7, 2005, <https://web.archive.org/web/20170320020829/http://www.dcsc.tudelft.nl/Research/Software/>, 2 pages.

Epperlein et al., "Recovering Markov Models from Closed-Loop Data", arXiv:1706.06359v4 [math.OC], Nov. 10, 2020, published in Automatica, May 2019, 21 pages.

Forssell et al., "Closed-loop Identification Revisited—Updated Version", Department of Electrical Engineering, Linkping University, S-581 83 Linkping, Sweden, Apr. 1, 1998, Report No. LiTH-ISY-R-2021, Submitted to Automatica, 55 pages.

Forssell et al., "Efficiency of Prediction Error and Instrumental Variable Methods for Closed-loop Identification", Proceedings of the 37th IEEE Conference on Decision & Control, Tampa, Florida USA, Dec. 1998, pp. 1287-1288.

Forssell, Urban, "Closed-loop Identification: Methods, Theory, and Applications", Linkoping Studies in Science and Technology, Dissertations, No. 566, Department of Electrical Engineering, Linkoping University, SE-581 83 Linkoping, Sweden, 1999, 263 pages.

Hansen et al., "Closed-Loop Identification via the Fractional Representation: Experiment Design", 1989 American Control Conference, Jun. 21-23, 1989, Pittsburgh, PA, USA, pp. 1422-1427.

Smith, Roy S., "Closed-Loop Identification of Flexible Structures: An Experimental Example", Journal of Guidance, Control, and Dynamics, vol. 21, No. 3, May-Jun. 1998, Introduction Only, <https://arc.aiaa.org/doi/abs/10.2514/2.4255?journalCode=jgcd>, 4 pages.

Van Den Hof et al., "An Indirect Method for Transfer Function Estimation from Closed Loop Data", Proceedings of the 31st Conference on Decision and Control, Tucson, Arizona, USA, Dec. 1992, pp. 1702-1706.

Van Den Hof et al., "Identification and Control—Closed Loop Issues", IFAC System Identification, Copenhagen, Denmark, 1994, pp. 311-323.

\* cited by examiner

IDENTIFICATION OF NON-DETERMINISTIC MODELS OF MULTIPLE DECISION MAKERS

BACKGROUND OF THE INVENTION

Field of the Invention

The present invention relates in general to computing systems, and more particularly, to various embodiments for identifying non-deterministic models of individual decision makers in an environment with multiple decision makers in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products for assisting in improvements to the quality of life and appropriate living accommodations.

SUMMARY OF THE INVENTION

Various embodiments for identifying non-deterministic models in a computing environment by a processor, are provided. In one embodiment, by way of example only, a method for identifying non-deterministic models of individual decision makers in an environment with multiple decision makers in a computing environment, again by a processor, is provided. One or more non-deterministic models may be cognitively identified according to a sequence of outcomes from decisions of each of a plurality of decision makers.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
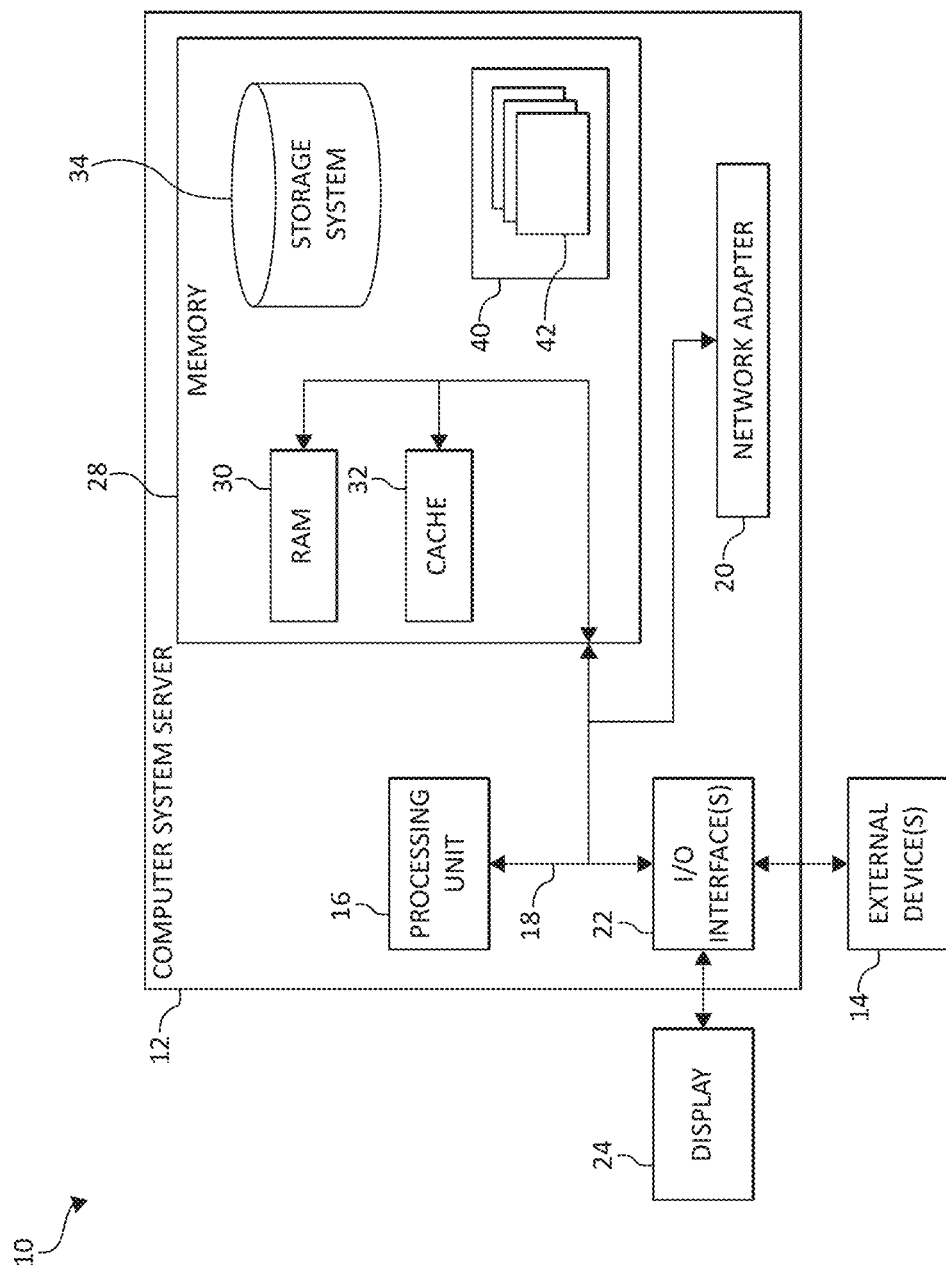
FIG. 1 is a block diagram depicting an exemplary cloud computing node according to an embodiment of the present invention.

Predictive analytics is an area of data mining that deals with extracting information from data and using it to predict trends and behavior patterns. Predictive models capture relationships among many factors to assess the risk potential associated with a particular set of conditions, thus guiding decision making for candidate transactions.

Modeling involves selecting suitable modeling techniques, generating test designs to validate the model, building predictive models and assessing these models. A predictive model is a function that predicts the value of some output variables based on the mapping between input variables. Historical data may be used to train the model to arrive at the most suitable modeling technique. For example, a predictive model might predict the risk of developing a certain disease based on patient details.

In its simplest form, a prediction model may be based on past behavior to determine future behavior. The process of predictive modeling attempts to predict a most likely outcome for a given starting condition based on a model. Various models can be used in this context, such as the naive Bayes model, the k-nearest neighbor algorithm, logistic regression, etc. A predictive model can use a ground truth set (i.e., a data set comprising members of a known classification) to train a classifier to automatically classify unknown members of an input data set.

However, a key challenge in building explanatory and/or predictive models is when the decisions are sequentially made in a non-deterministic manner by multiple decision makers (e.g., each decision is made by one decision maker only, but the outcome of a decision of one decision maker is the basis for the decision of another, and the actual decision makers are unknown to the observer). Therefore, a need exists for extracting a model of one or all decision makers from the outcomes.

Accordingly, the present invention provides a cognitive system for intelligent identification of non-deterministic models in a computing environment by a processor. One or more non-deterministic models may be identified according to a sequence of outcomes from decisions of each of a plurality of decision makers. For example, the present invention enables two or more decision makers to take turns (e.g., "switching") in the decision making, and each turn consists of an unknown number of decisions, each decision being taken in a non-deterministic fashion, and the switching from one decision maker to a next decision maker occurring at unknown time instants. In one aspect, a predictive model may be identified and generated for each decision maker using one or more machine learning operations such as, for example, Kalman filters, particle filtering techniques, and MCMC (Monte Carlo Markov Chain) techniques and to identify the transition matrices of two Markov chains (as well as the "switches"), based on an observed sequence of decisions or their outcomes ("states" or "emissions").

In one aspect, the non-deterministic models are probabilistic in that the decisions are taken with a fixed probability depending on the state of the system affected by the decisions. The non-deterministic models may suggest scores for decisions that depend on the state of the system affected by the decisions.

In this way, the present invention overcomes the current challenge encountered in many applications of different entities contributing in turn to observed decisions, but rather than by "vote" at each decision, decisions are made by one single entity, and then each subsequent decision maker makes (a) next decision(s). For example, the present invention may be applied where a vehicle uses automatic/self-driving functionality (or following instructions of a route-planning system closely) on some parts of a trip, while also manually driving during some other parts of the trip, where it is not known, which parts of the trip are governed by the driver and which by the self-driving functionality. Thus, the present invention may identify non-deterministic models so as to identify the driver's individual behavior.

Additionally, for example, in airline operations control, some delays and cancellations occur "naturally" (forced by other events), while others are the result of a deliberate choice of an operations controller. Again, the present invention may identify non-deterministic models so as to identify an impact of events on the delays and cancellations and/or identify what a human operations controller may do in a particular situation.

As an additional example, the present invention may identify non-deterministic models so as to identify, in various applications, one or more customized recommendations such as, for example, particular books to read, videos/movies to watch, music/audio data to listen to, particularly in situations where there are multiple users of one device using one user account to access the service. The present invention may identify each of the preferences of each actual user where multiple users of one device using one user account to access the service.

Accordingly, one or more models may be identified and/or created to predict the behavior of each constituent parts (e.g., each of the individual entities) rather than the complete system such as, for example, predicting driver behavior independently of a route planning system. As an additional example, a currently active decision maker may be used to deliver customized and/or targeted goods and/or services such as, for example, providing targeted ads to the individual user of a route planning system based on the identified and predicted behavior.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
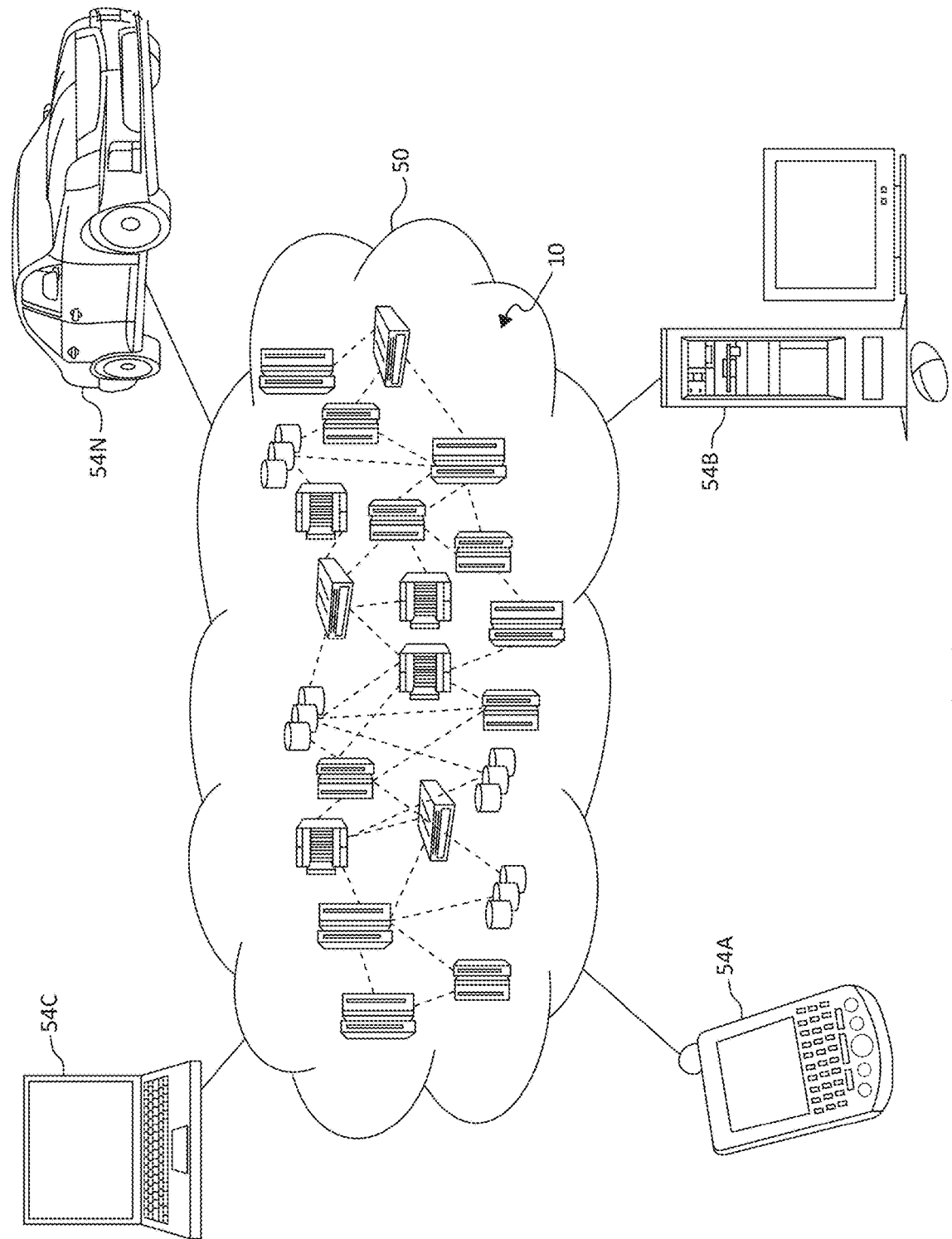
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
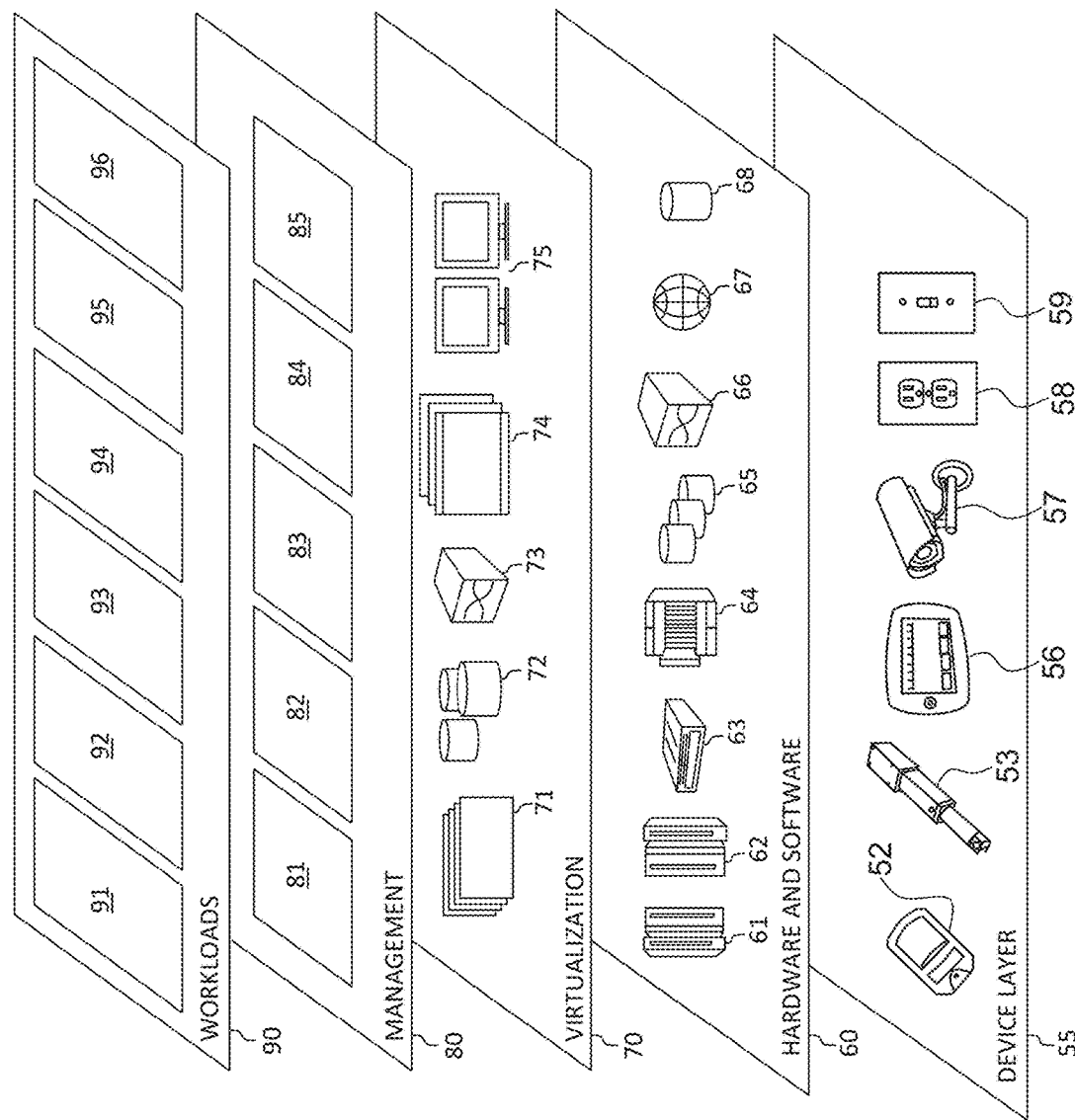
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for identifying non-deterministic models. In addition, workloads and functions 96 for identifying non-deterministic models may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for identifying non-deterministic models may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for identifying non-deterministic models of individual decision makers in an environment with multiple decision makers. Assuming there are multiple unknown decision makers taking turns in a decision making process, the present invention provides for identifying a non-deterministic model for each decision maker from the outcomes of their decisions. One or more non-deterministic models may be extracted for each individual decision maker contributing in turn to an observed sequence of decisions. User-behavior models may be estimated with the type of estimation operation depending on a model structure. For example, Markov chains may be employed for estimation of one or more Gaussian Mixture Model parameters.

A sequence of outcomes of decisions being made by the two or more decision makers may be considered. A specification of the model type to be estimated (e.g., Markov chain's transition matrix) may be defined, selected, and/or identified. Optionally, a specification of the turn-taking (e.g., the proportion of outcomes due to each decision maker) may also be considered for identifying non-deterministic models of individual decision makers.

For example, relying on a model of a driver's routing behavior (e.g., a route prediction system and/or cognitive in-car companion) the global positioning satellite ("GPS") trace may be recorded and the present invention may identify/update the driver's behavior in a routing model by considering the driver's behavior induced by the recommendations of the route prediction system and/or cognitive in-car companion systems.

As an additional example, a history of selected goods/services (e.g., selecting/watching a movie from a media delivery service), the present invention, deployed in a cloud computing environment, may identify, generate, and produce models of the individual user's behavior where multiple users use the same account. In this way, increased accuracy and efficiency of behavior predictions may be employed for predicting a next selected goods/services (e.g., predicting the next movie the user may watch). More generally, the present invention provides for observing decisions (e.g., decisions relating to travel/selected roads, watched movies, purchased/read books, etc.) without a knowledge of the decision maker of the observed decision, may build and generate individual models rather than an aggregate prediction model.

Figure 4:
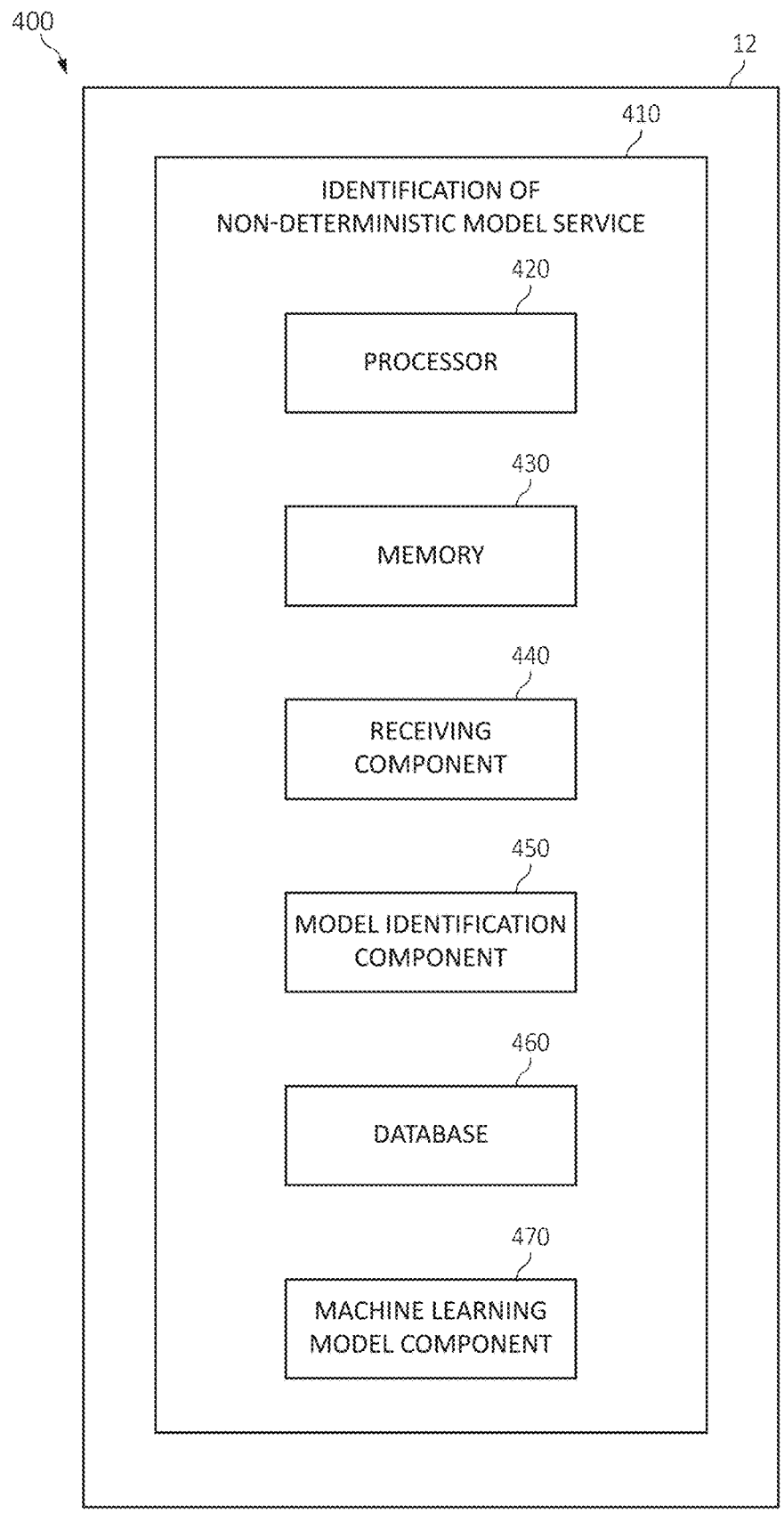
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An identification of non-deterministic model service 410 is shown, incorporating processing unit ("processor") 420 to perform various computational, data processing and other functionality in accordance with various aspects of the present invention. The identification of non-deterministic model service 410 may be provided by the computer system/server 12 of FIG. 1. The processing unit 420 may be in communication with memory 430. The identification of non-deterministic model service 410 may include a receiving component 440, a model identification component 450, a database 460, and a machine learning model component 470.

As one of ordinary skill in the art will appreciate, the depiction of the various functional units in the identification of non-deterministic model service 410 is for purposes of illustration, as the functional units may be located within the identification of non-deterministic model service 410 or elsewhere within and/or between distributed computing components.

In one aspect, the identification of non-deterministic model service 410 may provide virtualized computing services (i.e., virtualized computing, virtualized storage, virtualized networking, etc.). More specifically, the identification of non-deterministic model service 410 may provide, and/or be included in, a virtualized computing, virtualized storage, virtualized networking and other virtualized services that are executing on a hardware substrate.

In one aspect, the receiving component 440 may receive 1) a number of time series of actions, which may be paired with time series of exogenous inputs, 2) a number of individual decision makers, 3) a specification of the structure of each decision maker's model to output (e.g., a model structure is the form of the equation used to compute probabilities of the next decision such as, for example, For a Markov chain, that is P(next decision=x if we know that previous decision=y)=$p_{y,x}$ and the numbers $p_{y,x}$ need to be estimated for all possible y and x), and/or 4) a specification of a switching policy.

Herein, model structure specification is a mathematical model, for example, but not limited to: a hidden Markov model (HMM), a Poisson process, a non-deterministic finite Automaton, with one or more parameters free and to be estimated, for example in the HMM zero or more elements of a) initial probabilities, b) state-to-state transition matrix, and c) state-to-observable emission matrix can be free. All such model structure specifications known to the invention are collected in the model structure repository.

Furthermore, the switching policy governs, how it is decided, which decision maker will make the next decision. For example, the policy can be completely unknown, or it can state that each decision maker gets to make at least N consecutive decisions, or it can state that after certain decisions, only a subset of decision makers may be active.

The model identification component 450 may collect the received data to generate one or more models describing each individual decision maker with each of the models having a required model structure. Each action may be described by one or more categorical variable and/or a combination of categorical and continuous variables.

In one aspect, where a model structure is not received (e.g., the specification of the structure of each decision maker's model to output is not received), the model identification component 450 and/or the machine learning model component 470 may estimate and provide a best model structure from a repository of model structures such as, in database 460. For each decision, a score may be determined for identifying a likelihood/percentage of the decision being made by each of the decision makers.

The best model structure may be the structure from the model structure repository, for which a score such as the Akaike Information Criterion (AIC) or Bayesian Information Criterion (BIC) is optimized. There may be one such structure per decision maker, or one such structure for the entire environment, according to requirements.

In the event that a number of decision makers are not received or defined, the model identification component 450 and/or the machine learning model component 470 may estimate the number of decision makers, which may be performed by selecting the number maximizing the likelihood (e.g., the score) or the abovementioned AIC and BIC.

Given the model structure and the number of decision makers, the model identification component 450 and/or the machine learning model component 470 may generate (e.g., output) a description of each individual decision maker. Each individual decision maker may be described by a hidden Markov model, which consists of a stochastic state-to-state transition matrix and a row-stochastic state-to-action emission matrix. In an additional aspect, given the model structure and the number of decision makers, and the exogenous inputs paired with one or more time-series of actions, the model identification component 450 and/or the machine learning model component 470 may generate (e.g., output) a description of each individual decision maker. A specification of a switching policy may be deterministic and may include one or more identified times at which the decision makers take turns (e.g., times of the switching of decisions). The specification of a switching policy may be stochastic, that may include the probabilities of each decision maker taking turn.

In one embodiment, by way of example only, the machine learning model component 470 as used herein may include, for example, an instance of IBM® Watson® such as Watson® Analytics (IBM® and Watson® are trademarks of International Business Machines Corporation). By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
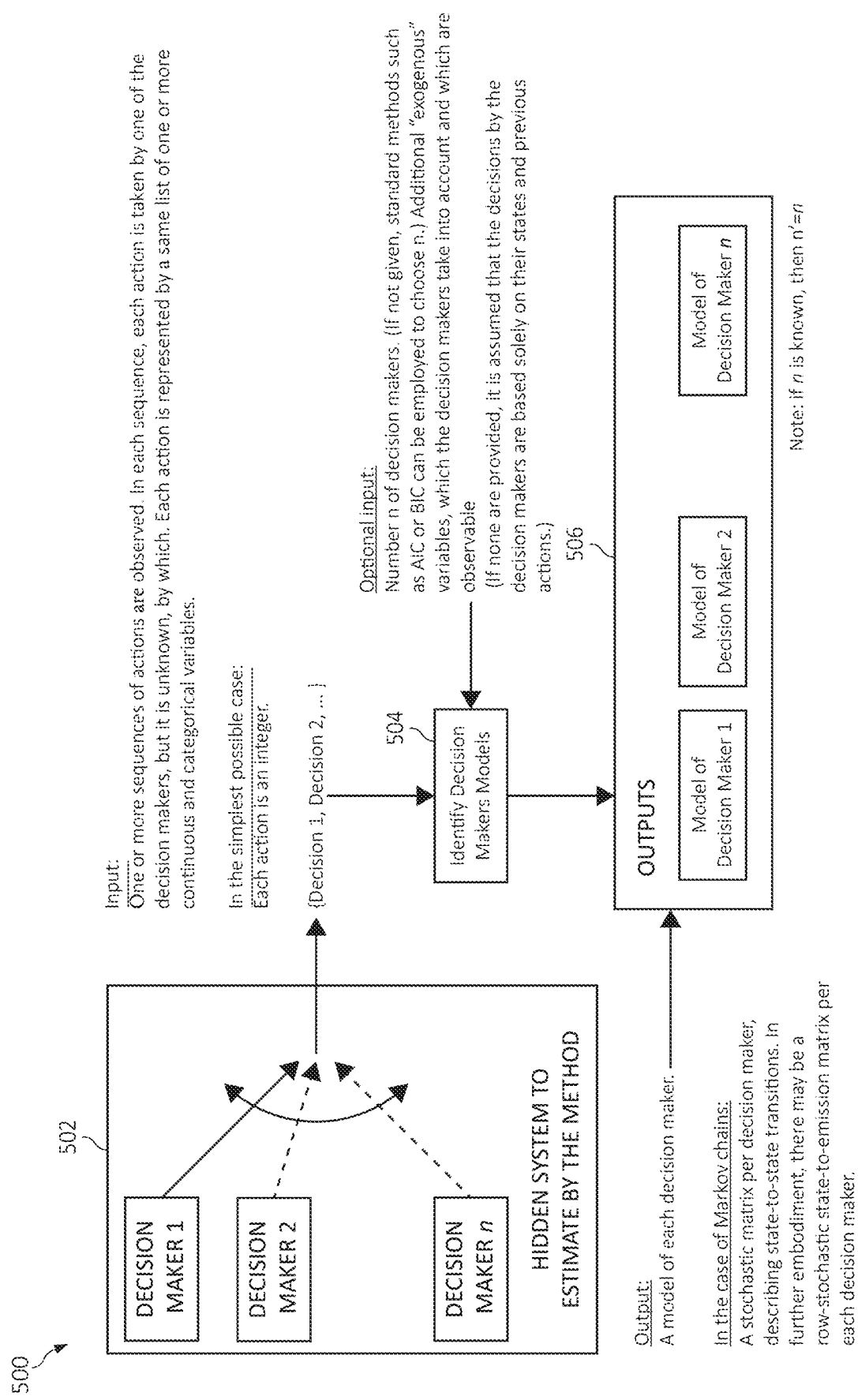
FIG. 5A-5B are block-flow diagram depicting an exemplary functional relationship between various aspects of the present invention.
Figure 5B:
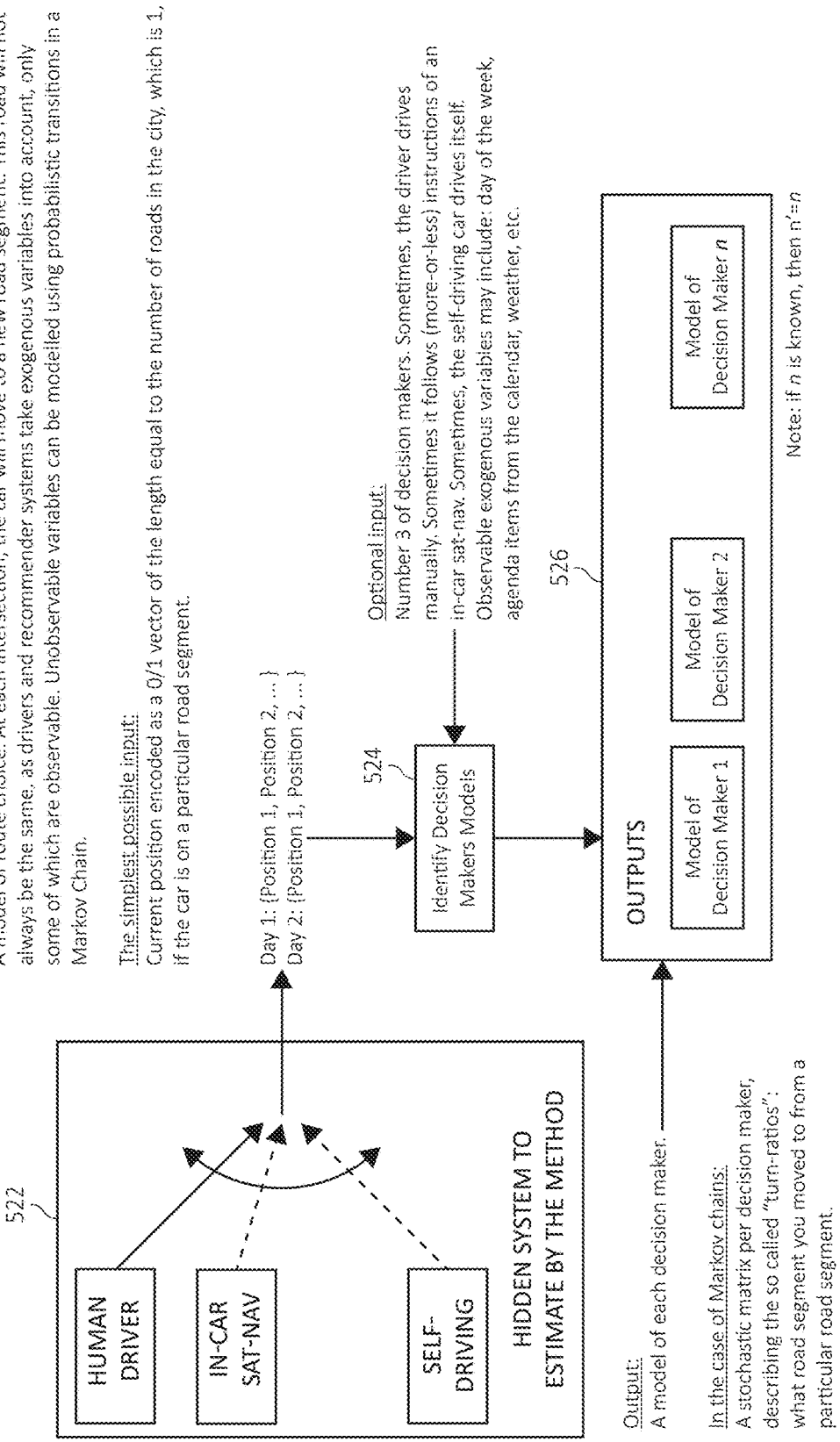

Turning now to FIG. 5A-5B, block diagrams of exemplary functionality 500 and 550 relating to identifying one or more non-deterministic models are depicted according to various aspects of the present invention. As shown, the various blocks of functionality are depicted with arrows designating the blocks' 500 and 550 relationships with each other and to show process flow. Additionally, descriptive information is also seen relating each of the functional blocks 500 and 550. As will be seen, many of the functional blocks may also be considered "modules" of functionality, in the same descriptive sense as has been previously described in FIG. 5A-5B. With the foregoing in mind, the module blocks 500 and 550 may also be incorporated into various hardware and software components of a system for image enhancement in accordance with the present invention. Many of the functional blocks 500 and 550 may execute as background processes on various components, either in distributed computing components, or on the user device, or elsewhere, and generally unaware to the user performing generalized tasks.

Turning now to FIG. 5A, starting with block 502, one or more decision makers (e.g., decision maker 1, decision maker 2, and decision maker n) are assumed to be hidden and/or unknown (e.g., decision maker 1, decision maker 2, or a combination of decision maker 1, decision maker 2, and decision maker n make the decisions in turns, i.e., subsequent to each other). That is, at this point it may be unknown as which decision maker is active and/or which decision maker makes the decision. Rather, only the outcome of the decision (e.g., decision 1, decision 2, . . . , decision n) of the decision maker 1, decision maker 2, or decision maker n are known. Also, the outcomes of the decisions (e.g., decision 1, decision 2, . . . , decision n) are collected and provided as input for identifying one or more decision maker models, as in block 504.

In order to identify each of the decision maker models for each respective decision maker, at block 504, input data may include one or more sequences of actions observed. In each sequence, each action is taken by one of the decision makers, but it is unknown, by which. Each action is represented by a same list of one or more continuous and categorical variables.

In one aspect, each action may be represented by an integer. In another aspect, each action may be represented by a tuple of categorical and continuous variables. By means of example, in the case of driving a car, categorical variables may describe, which turns are taken, what gear the car is in, and whether the lights are on or off; continuous variables may describe the current speed of the car, and the steering angle. An action could then be described by a tuple (turn onto=Main Street, Gear=2, Lights=on, Speed=7.2 m/s, Steering Angle=−10°).

Additional input may optionally include, the number of decision makers, denoted by n. If the number n of decision makers is not provided, one or more estimators of relative quality of statistical models may be employed such as, for example, Akaike information criterion ("AIC") or Bayesian information criterion ("BIC") to select n. Additional "exogenous" variables, which the decision makers may consider, and which are observable, may also be used as input. If no exogenous variables are provided, it may be assumed that the decisions by the decision makers are based solely on each state of the decision maker and previous actions. In short, the collected input data may be used to analyze and identify one or more decision maker models, as in block 504.

As indicated in block 506, a non-deterministic model for each decision maker may be created from the identified decision maker models such as, for example, non-deterministic model for decision maker 1, non-deterministic model for decision maker 2, and non-deterministic model for decision maker n'. It should be noted that if the number of decision makers is known (e.g., the variable "n" is known), that n' is equal to n (i.e., n'=n). In the event that one or more machine learning operations such as, the MCMC (Markov Chain) operation is used, a stochastic matrix per decision maker, describing state-to-state transitions, may be used.

To further illustrate the operation of FIG. 5A, consider the following exemplary functional operations of FIG. 5B. That is, FIG. 5B illustrates aspects of the present invention employed in a cognitive route planning system to model a selected route. For example, it may be assumed that at each intersection, a vehicle (with self-driving functionality) may move to a new road segment. This road will not always be the same, as drivers and self-driving/navigation recommendation systems may take exogenous variables into account, only some of the exogenous variables are observable. Unobservable variables may be modelled using probabilistic transitions, for example in a Markov Chain.

Starting with block 522, one or more decision makers (e.g., human driver, an in-vehicle satellite navigation system ("in-car sat-nay"), and a self-driving system ("self-driving) are assumed to be hidden and/or unknown to each other. That is, at this point it may be unknown as which decision maker is active and/or which decision maker makes the decision. Rather, only the outcome of the decision (e.g., day 1: {position 1, position 2, . . . } and Day 2: {position 1, position 2, . . . ,) are known. Also, the outcome of the decision (e.g., .g., day 1: {position 1, position 2, . . . } and Day 2: {position 1, position 2, . . . ,) may be collected and provided as input for identifying one or more decision maker models, as in block 524. That is, current position data may be encoded as a 0/1 vector of a length equal to the number of roads in a city, which may be 1, if the car is on a particular road segment.

In order to identify each of the decision maker models for each respective decision maker, at block 524, input data may include one or more sequences of actions. Additional inputs may optionally include, the number n input such as, for example n=3. In one aspect, the additional input may include data that indicates that the driver drives manually at certain times, the driver follows one or more instructions of an in-car sat-nay while operating the vehicle, and the input data may include data indicating the vehicle was operating in the self-driving mode rather than the manual driving mode.

Observable exogenous variables may include a day of the week, agenda items from the calendar, weather, etc. If no exogenous variables are provided, it may be assumed that the decisions by the decision makers are based solely on each state of the decision maker and previous actions. In short, the collected input data may be used to analyzed and identify one or more decision maker models, as in block 524.

As indicated in block 526, a non-deterministic model for each decision maker may be created from the identified decision maker models such as, for example, non-deterministic model for decision maker 1 (e.g., human driver), non-deterministic model for decision maker 2 (e.g., in-car sat-nay system), and non-deterministic model for decision maker "n" (e.g., self-driving system). It should be noted that if the number of decision makers are known (e.g., the variable "n" is known), that n' is equal to n (e.g., n'=n).

Figure 6:
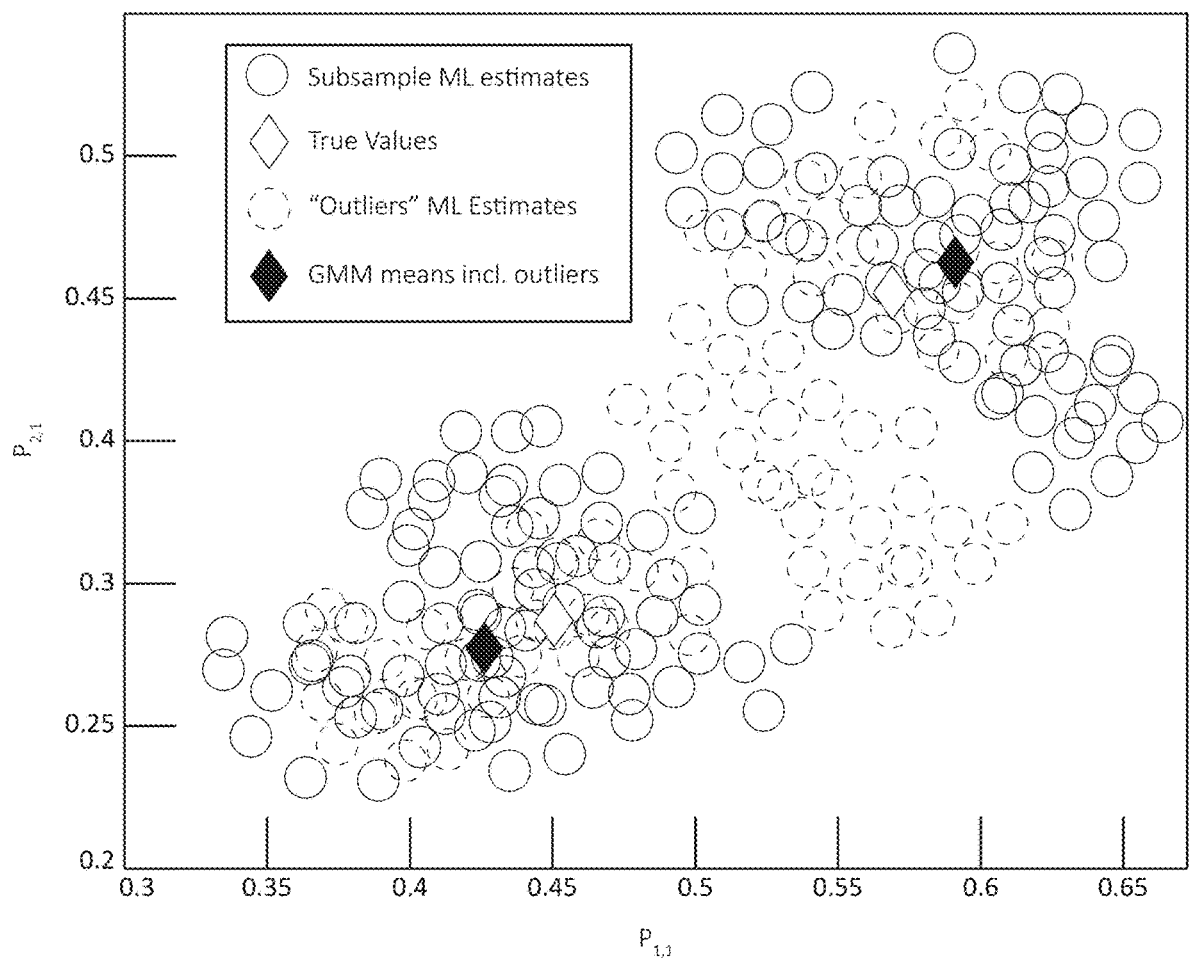
FIG. 6 is a graph depicting a transition matrix estimation according to an embodiment of the present invention.

Turning now to FIG. 6, graph 600 illustrates a state-to-state transition matrix estimation using gaussian mixture modeling ("GMM"). That is, a Markov chain may be moving through (finite) state space with the transition probabilities changing at some time instances. As input data, a sequence of observations (e.g., realizations of the stochastic process) $\{O1, \ldots, OT\}$ may be provided. An upper bound K on the amount of times that the transition probabilities switched may also be used as input for determining one or more non-deterministic models. Also, a number n of different transition probability matrices that are to be identified may be used as the input.

In operation, an S length of subintervals may be selected to maintain a probability of selecting a subinterval with a, where S is a positive integer. Subsequently, N subintervals of length S may also be selected, where N is also a positive integer or a defined value. A maximum likelihood (ML) estimate of the state-to-state transition may be determined (or calculated) for each of the selected subintervals. In case there was no switch reflected in the sub-interval, the ML estimate will be normally distributed around the true values, i.e., the state-to-state transition probability of a given decision maker. In case there was a switch reflected in the sub-interval, the ML estimate may be arbitrary. In the parameter identification in GMM, it may estimate the state-to-state transition probability matrices of the individual decision makers, while considering the ML estimates from the sub-interval where there were switches as arbitrary noise. It should be noted that the amount of this arbitrary noise is bounded a priori, as it is based on the length S of the subintervals and the bound K on the number of switches.

Figure 7:
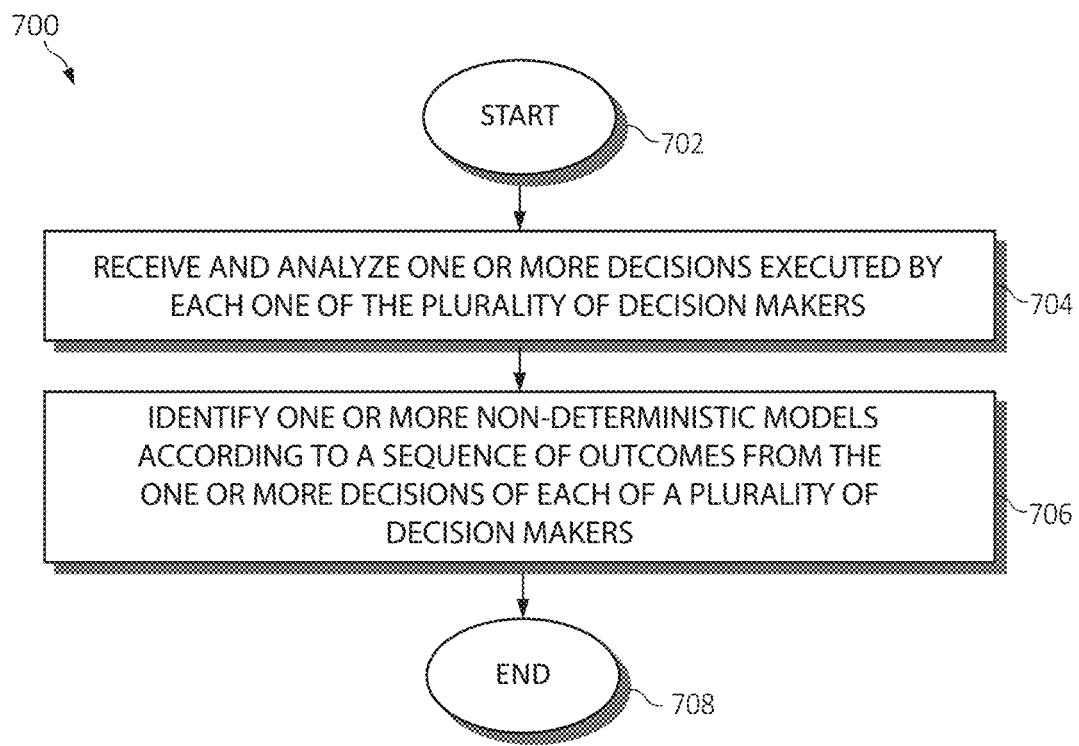
FIG. 7 is a flowchart diagram depicting an exemplary method for identifying non-deterministic models of individual decision makers in an environment with multiple decision makers by a processor in which aspects of the present invention may be realized.

Turning now to FIG. 7, a method 700 for identifying non-deterministic models of individual decision makers in an environment with multiple decision makers is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

One or more decisions executed by each one of the plurality of decision makers may be received and analyzed, as in block 704. One or more non-deterministic models may be cognitively identified according to a sequence of outcomes from the one or more decisions of each of a plurality of decision makers, as in block 706. The functionality 700 may end in block 708.

Figure 8:
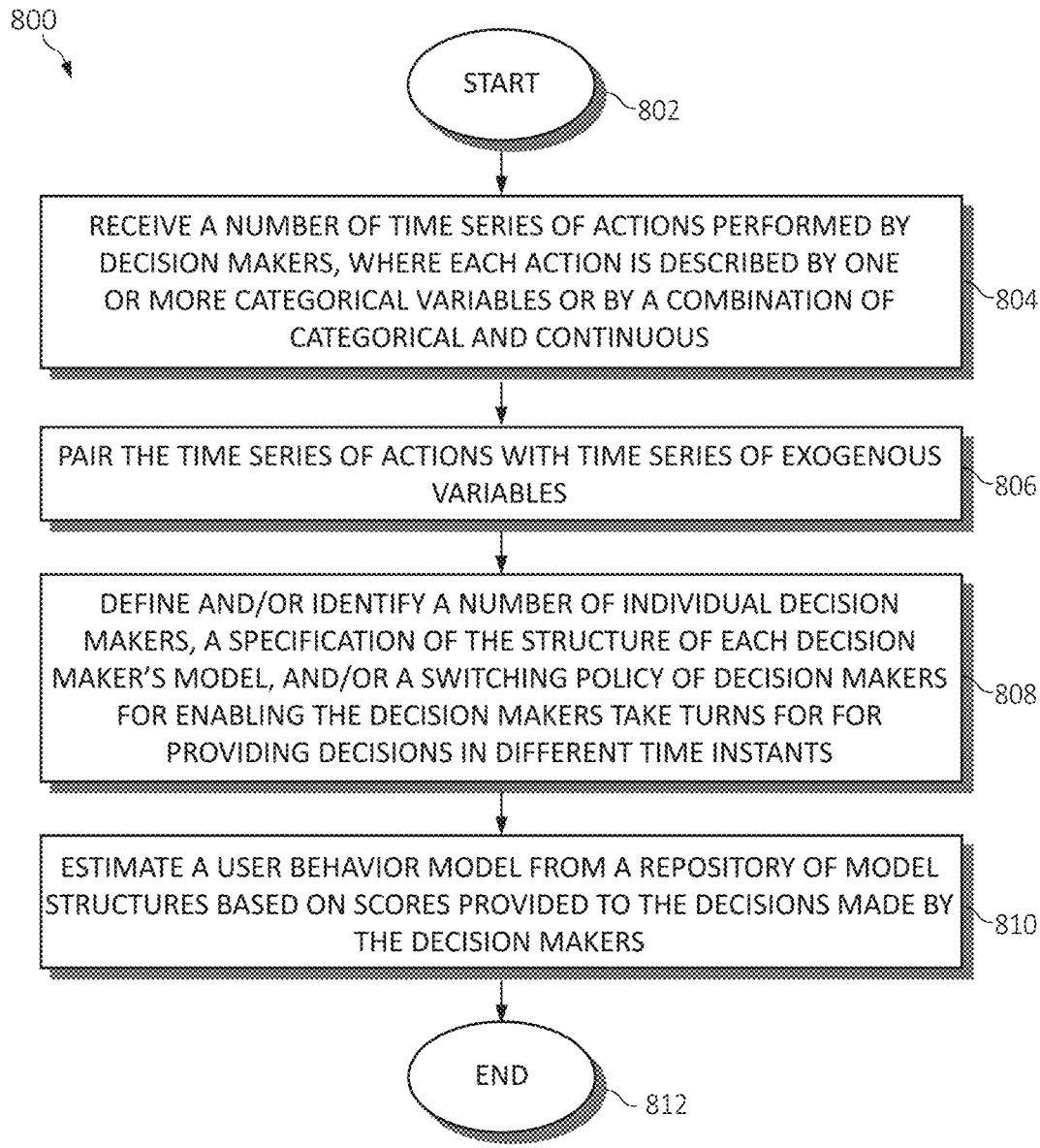
FIG. 8 is a flowchart diagram depicting an additional exemplary method for identifying non-deterministic models of individual decision makers in an environment with multiple decision makers by a processor, again in which aspects of the present invention may be realized.

Turning now to FIG. 8, an additional method 800 for identifying non-deterministic models of individual decision makers in an environment with multiple decision makers is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802.

A number of time series of actions performed by decision makers may be received, where each action is described by one or more categorical variables or by a combination of categorical and continuous variables, as in block 804. The time series of actions may be paired with time series of exogenous variables, as in block 806. The number of individual decision makers, a specification of the structure of each decision maker's model, and/or a switching policy of decision makers for enabling the decision makers take turns for providing decisions in different time instants may be supplied, or identified in block 810. A user behavior model may be estimated from a repository of model structures based on scores computed for each decision maker model structure, as in block 810. The functionality 800 may end in block 812.

In one aspect, in conjunction with and/or as part of at least one block of FIGS. 7-8, the operations of methods 700 and/or 800 may include each of the following. The operations of methods 700 and/or 800 may include describing each of the one or more time series actions according to a categorical variable, a continuous variable, or a combination thereof. The operations of methods 700 and/or 800 may define the specification of a structure of a decision model employed by each one of the plurality of decision maker, and/or define a switching policy enabling each of the plurality of decision makers to provide a decision at selected time instances. The operations of methods 700 and/or 800 may score each of the decision maker models according to a probability of the decision being selected by of each of the plurality of decision makers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for implementing identification of predictive models in a computing environment, comprising:
receiving one or more time series of actions associated with input data, wherein each of the actions is executed by one of a plurality of decision makers;
receiving a specification of a switching policy constraining a number of decisions able to be made by each of the plurality of decision makers, wherein only a single decision maker of the plurality of decision makers is allowed to make decisions at any given time, and wherein the single decision maker makes an unknown number of consecutive decisions until the switching policy transfers the decision making to a next decision maker of the plurality of decision makers at an unknown time instance;
monitoring behavior of each of the plurality of decision makers as the consecutive decisions are made;
receiving a specification of a structure of a decision model employed by at least some of the plurality of decision makers, wherein the structure of the decision model comprises a form of an equation used to compute probabilities of a next decision made by a specific one of the plurality of decision makers to which the structure represents;

responsive to determining the specification of the structure of the decision model is not received for at least one of the plurality of decision makers, determining and assigning a score, to each decision observed by an unknown one of the plurality of decision makers according to an existing model structure selected from a repository of model structures, indicative of a probability that a respective decision was made by a respective one of the plurality of decision makers, wherein the score is used in estimating a number of the plurality of decision makers; and executing machine learning logic to train one or more non-deterministic models using examples selected from a sequence of outcomes from the decisions of each of the plurality of decision makers, wherein the one or more non-deterministic models are generated for each decision maker according to the monitored behavior to automatically predict an outcome of those of the decisions, with respect to the input data, that depend on a state of the system affected by the decisions.

2. The method of claim 1, further including describing each of the one or more time series actions according to a categorical variable, a continuous variable, or a combination thereof.

3. The method of claim 1, further including defining the switching policy enabling each of the plurality of decision makers to provide the decisions at selected time instances.

4. The method of claim 3, further allowing for the switching policy to enable each of the plurality of decision makers to provide the decisions at the selected time instances to depend on the state of the system affected by the decisions.

5. The method of claim 1, wherein the non-deterministic models are probabilistic such that the decisions have a fixed probability depending on the state of the system affected by the decisions.

6. The method of claim 1, further including estimating a user behavior model from the repository of model structures according to the scores associated with the decisions of each of the plurality of decision makers.

7. A system for implementing identification of predictive models in a computing environment, comprising:
one or more computers with executable instructions that when executed cause the system to:
receive one or more time series of actions associated with input data, wherein each of the actions is executed by one of a plurality of decision makers;
receive a specification of a switching policy constraining a number of decisions able to be made by each of the plurality of decision makers, wherein only a single decision maker of the plurality of decision makers is allowed to make decisions at any given time, and wherein the single decision maker makes an unknown number of consecutive decisions until the switching policy transfers the decision making to a next decision maker of the plurality of decision makers at an unknown time instance;
monitor behavior of each of the plurality of decision makers as the consecutive decisions are made;
receive a specification of a structure of a decision model employed by at least some of the plurality of decision makers, wherein the structure of the decision model comprises a form of an equation used to compute probabilities of a next decision made by a specific one of the plurality of decision makers to which the structure represents;

responsive to determining the specification of the structure of the decision model is not received for at least one of the plurality of decision makers, determine and assign a score, to each decision observed by an unknown one of the plurality of decision makers according to an existing model structure selected from a repository of model structures, indicative of a probability that a respective decision was made by a respective one of the plurality of decision makers, wherein the score is used in estimating a number of the plurality of decision makers; and executing machine learning logic to train one or more non-deterministic models using examples selected from a sequence of outcomes from decisions of each of a plurality of decision makers, wherein the one or more non-deterministic models are generated for each decision maker according to the monitored behavior to automatically predict an outcome of those of the decisions, with respect to the input data, that depend on a state of the system affected by the decisions.

8. The system of claim 7, wherein the executable instructions further describe each of the one or more time series actions according to a categorical variable, a continuous variable, or a combination thereof.

9. The system of claim 7, wherein the executable instructions further define the switching policy enabling each of the plurality of decision makers to provide the decisions at selected time instances.

10. The system of claim 7, wherein the executable instructions further estimate a user behavior model from the repository of model structures according to the scores associated with the decisions of each of the plurality of decision makers.

11. A computer program product for implementing intelligent identification of predictive models by a processor, the computer program product comprising a non-transitory computer-readable storage medium having computer-readable program code portions stored therein, the computer-readable program code portions comprising:
an executable portion that receives one or more time series of actions associated with input data, wherein each of the actions is executed by one of a plurality of decision makers;
an executable portion that receives a specification of a switching policy constraining a number of decisions able to be made by each of the plurality of decision makers, wherein only a single decision maker of the plurality of decision makers is allowed to make decisions at any given time, and wherein the single decision maker makes an unknown number of consecutive decisions until the switching policy transfers the decision making to a next decision maker of the plurality of decision makers at an unknown time instance;
an executable portion that monitors behavior of each of the plurality of decision makers as the consecutive decisions are made;
an executable portion that receives a specification of a structure of a decision model employed by at least some of the plurality of decision makers, wherein the structure of the decision model comprises a form of an equation used to compute probabilities of a next decision made by a specific one of the plurality of decision makers to which the structure represents;
an executable portion that, responsive to determining the specification of the structure of the decision model is not received for at least one of the plurality of decision makers, determines and assigns a score, to each decision observed by an unknown one of the plurality of decision makers according to an existing model structure selected from a repository of model structures, indicative of a probability that a respective decision was made by a respective one of the plurality of decision makers, wherein the score is used in estimating a number of the plurality of decision makers; and an executable portion that executes machine learning logic to train one or more non-deterministic models using examples selected from a sequence of outcomes from decisions of each of a plurality of decision makers, wherein the one or more non-deterministic models are generated for each decision maker according to the monitored behavior to automatically predict an outcome of those of the decisions, with respect to the input data, that depend on a state of the system affected by the decisions.

12. The computer program product of claim 11, further including an executable portion that describes each of the one or more time series actions according to a categorical variable, a continuous variable, or a combination thereof.

13. The computer program product of claim 11, further including an executable portion that defines the switching policy enabling each of the plurality of decision makers to provide the decisions at selected time instances.

14. The computer program product of claim 11, further including an executable portion that estimates a user behavior model from the repository of model structures according to the scores associated with the decisions of each of a plurality of decision makers.

* * * * *